United States Patent
Chen et al.

(10) Patent No.: US 12,222,977 B2
(45) Date of Patent: Feb. 11, 2025

(54) METHOD OF PROCESSING MULTIMEDIA DATA, DEVICE AND MEDIUM

(71) Applicant: BEIJING BAIDU NETCOM SCIENCE TECHNOLOGY CO., LTD., Beijing (CN)

(72) Inventors: Shuai Chen, Beijing (CN); Qi Wang, Beijing (CN); Zhifan Feng, Beijing (CN); Chunguang Chai, Beijing (CN); Yong Zhu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 122 days.

(21) Appl. No.: 18/080,432

(22) Filed: Dec. 13, 2022

(65) Prior Publication Data

US 2023/0115737 A1    Apr. 13, 2023

(30) Foreign Application Priority Data

Dec. 13, 2021  (CN) .......................... 202111521051.5

(51) Int. Cl.
*G06F 18/25*  (2023.01)
*G06F 16/43*  (2019.01)
(Continued)

(52) U.S. Cl.
CPC ............ *G06F 16/483* (2019.01); *G06F 16/43* (2019.01); *G06F 18/22* (2023.01); *G06F 18/253* (2023.01); *G06N 5/02* (2013.01)

(58) Field of Classification Search
CPC ......... G06N 5/02; G06F 18/253; G06F 18/22; G06F 16/43; G06F 16/483
(Continued)

(56) References Cited

U.S. PATENT DOCUMENTS

2006/0112055 A1*  5/2006  Tapio .................... G06N 5/025
                                                    706/46
2012/0124079 A1   5/2012  Kinsella
(Continued)

FOREIGN PATENT DOCUMENTS

CN        110532404      12/2019
CN        112464814       3/2021
(Continued)

OTHER PUBLICATIONS

Office Action dated Sep. 28, 2022, issued in corresponding Chinese Application No. 202111521051.5, pp. 1-13.
(Continued)

*Primary Examiner* — Sherief Badawi
*Assistant Examiner* — Earl Levi Elias
(74) *Attorney, Agent, or Firm* — Pillsbury Winthrop Shaw Pittman, LLP

(57) ABSTRACT

A method of processing multimedia data, a device, and a medium, which relates to a field of an artificial intelligence technology, in particular to fields of knowledge graph and deep learning. The method of processing the multimedia data includes: recognizing the multimedia data so as to obtain at least one key information of the multimedia data; querying a predetermined knowledge base according to the at least one key information, so as to determine a multimedia name associated with the at least one key information and an association degree between the multimedia name and the at least one key information; and determining, in the multimedia name, a name of the multimedia data based on a similarity between alternative multimedia data for the multimedia name and the multimedia data, in response to the association degree being less than a first threshold value.

15 Claims, 7 Drawing Sheets

(51) Int. Cl.
  *G06F 16/483*  (2019.01)
  *G06F 18/22*   (2023.01)
  *G06N 5/02*    (2023.01)

(58) Field of Classification Search
  USPC .......................................................... 707/769
  See application file for complete search history.

(56) References Cited

U.S. PATENT DOCUMENTS

| | | |
|---|---|---|
| 2013/0304733 A1 | 11/2013 | Kim et al. |
| 2014/0108453 A1* | 4/2014 | Venkataraman ...... G06F 16/907 707/774 |
| 2015/0310028 A1* | 10/2015 | Bubash ................. G06F 16/166 707/821 |
| 2018/0060727 A1* | 3/2018 | Rainwater ............... G06N 3/045 |
| 2020/0084519 A1* | 3/2020 | Pappu ................ H04N 21/8405 |
| 2021/0295203 A1* | 9/2021 | Liao ........................ G06N 3/006 |
| 2022/0027634 A1 | 1/2022 | Wang et al. |
| 2022/0108689 A1* | 4/2022 | Tripathi ................... G06N 3/04 |
| 2022/0188577 A1* | 6/2022 | Chopde ................. G06V 10/82 |
| 2022/0358395 A1* | 11/2022 | McCreary ................ G06N 5/04 |

FOREIGN PATENT DOCUMENTS

| | | |
|---|---|---|
| CN | 113190695 | 7/2021 |
| CN | 113239215 | 8/2021 |
| CN | 113392265 | 9/2021 |

OTHER PUBLICATIONS

European Search Report issued in the corresponding European Patent Application No. 22213098.1, dated May 8, 2023.

\* cited by examiner

METHOD OF PROCESSING MULTIMEDIA DATA, DEVICE AND MEDIUM

This application claims priority to Chinese Patent Application No. 202111521051.5, filed on Dec. 13, 2021, which is incorporated herein in its entirety by reference.

TECHNICAL FIELD

The present disclosure relates to a field of an artificial intelligence technology, in particular to fields of knowledge graph and deep learning, and more specifically, to a method of processing multimedia data, an electronic device, and a storage medium.

BACKGROUND

With a development of an electronic technology and an Internet technology, forms of dissemination of multimedia data are becoming more and more diversified. For example, there is a form in which partial data is intercepted from complete multimedia data for dissemination. In order to better manage the dissemination of the multimedia data, a deep understanding of the multimedia data is usually required.

SUMMARY

A method of processing multimedia data, an electronic device, and a storage medium are provided.

An aspect of the present disclosure provides a method of processing multimedia data, including: recognizing the multimedia data so as to obtain at least one key information of the multimedia data; querying a predetermined knowledge base according to the at least one key information, so as to determine a multimedia name associated with the at least one key information and an association degree between the multimedia name and the at least one key information; and determining, in the multimedia name, a name of the multimedia data based on a similarity between alternative multimedia data for the multimedia name and the multimedia data, in response to the association degree being less than a first threshold value.

Another aspect of the present disclosure provides an electronic device, including: at least one processor; and a memory communicatively connected to the at least one processor, wherein the memory stores instructions executable by the at least one processor, and the instructions, when executed by the at least one processor, are configured to cause the at least one processor to implement the method of processing the multimedia data provided in the present disclosure.

Another aspect of the present disclosure provides a non-transitory computer-readable storage medium having computer instructions therein, wherein the computer instructions are configured to cause a computer system to implement the method of processing the multimedia data provided in the present disclosure.

It should be understood that content described in this section is not intended to recognize key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, wherein.

DETAILED DESCRIPTION OF EMBODIMENTS

Exemplary embodiments of the present disclosure will be described below with reference to accompanying drawings, which include various details of embodiments of the present disclosure to facilitate understanding and should be considered as merely exemplary. Therefore, those skilled in the art should realize that various changes and modifications may be made to embodiments described herein without departing from the scope and spirit of the present disclosure. Likewise, for clarity and conciseness, descriptions of well-known functions and structures are omitted in the following description.

According to embodiments of the present disclosure, when performing in-depth understanding of partial data intercepted from complete multimedia data, it is particularly important to recognize a name of the multimedia data to which the intercepted partial data belongs. For example, after obtaining the name of the multimedia data to which the intercepted partial data belongs, it is convenient to combine the complete multimedia data to understand a content of the intercepted partial data.

Based on this, the present disclosure provides a method of processing multimedia data, which may improve processing efficiency and processing accuracy, and the method includes a key information obtaining stage, an information determination stage, and a name determination stage. In the key information obtaining stage, the multimedia data is recognized, so as to obtain at least one key information of the multimedia data. In the information determination stage, a predetermined knowledge base is queried according to the at least one key information, so as to determine a multimedia name associated with the at least one key information and an association degree between the multimedia name and the at least one key information. In the name determination stage, in response to the association degree being less than a first threshold value, a name of the multimedia data in the multimedia name is determined based on a similarity between alternative multimedia data for the multimedia name and the multimedia data.

An application scenario of the method and the apparatus provided in the present disclosure will be described below in combination with FIG. 1.

Figure 1:
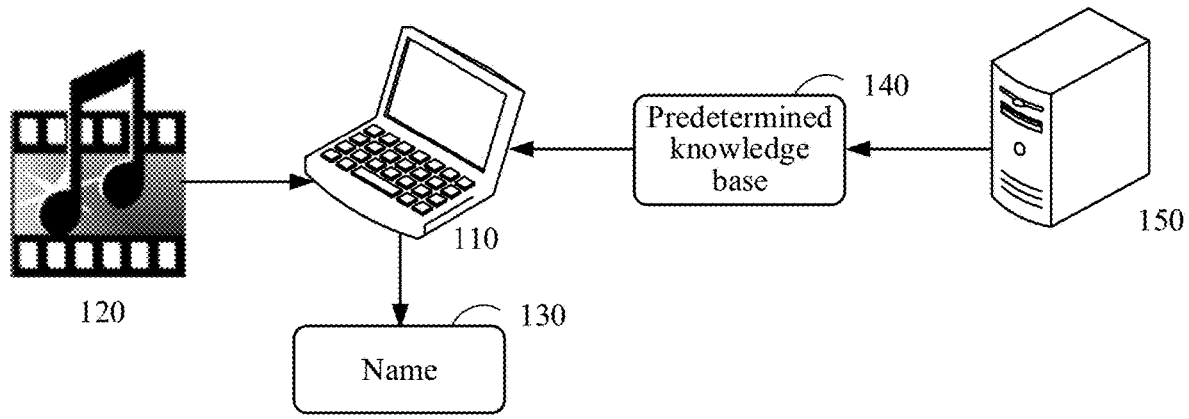
FIG. 1 shows a schematic diagram of an application scenario of a method and an apparatus of processing multimedia data according to an embodiment of the present disclosure.

FIG. 1 shows an application scenario diagram of a method and an apparatus of processing multimedia data according to an embodiment of the present disclosure.

As shown in FIG. 1, an application scenario 100 may include a terminal device 110, and the terminal device 110 may be any electronic device with a processing function, including but not limited to a smart phone, a tablet computer, a laptop computer, a desktop computer, etc.

The terminal device 110 may recognize, for example, input multimedia data 120, to determine a name 130 of the multimedia data 120. For example, when the multimedia data 120 is recognized, a predetermined knowledge base 140 may be queried according to a key information of the multimedia data, and an association relationship between the key information and the multimedia name may be maintained in the predetermined knowledge base 140.

In an embodiment, the application scenario 100 may also include a server 150, and the server 150 may maintain the above-mentioned predetermined knowledge base 140, for example. The terminal device 110 may be communicatively connected to the server 150 through a network. For example, the terminal device 110 may send an acquisition request to the server 150, and the server 150 sends the predetermined knowledge base 140 to the terminal device 110 in response to the acquisition request, so as to facilitate the terminal device 110 to query.

In an embodiment, the terminal device 110 may also send the multimedia data 120 to the server 150, and the server 150 may recognize the multimedia data 120 so as to determine the name 130 of the multimedia data 120.

It should be noted that the method of processing the multimedia data provided in the present disclosure may be performed by, for example, the terminal device 110 or the server 150. Accordingly, the apparatus of processing the multimedia data provided in the present disclosure may be provided in the terminal device 110 or the server 150.

It may be understood that the type and number of terminal devices and servers in the application scenario are only schematic. Any number and type of terminal devices and servers may be provided according to implementation needs.

The method of processing the multimedia data provided in the present disclosure will be described in detail below in combination with FIG. 2 to FIG. 7.

Figure 2:
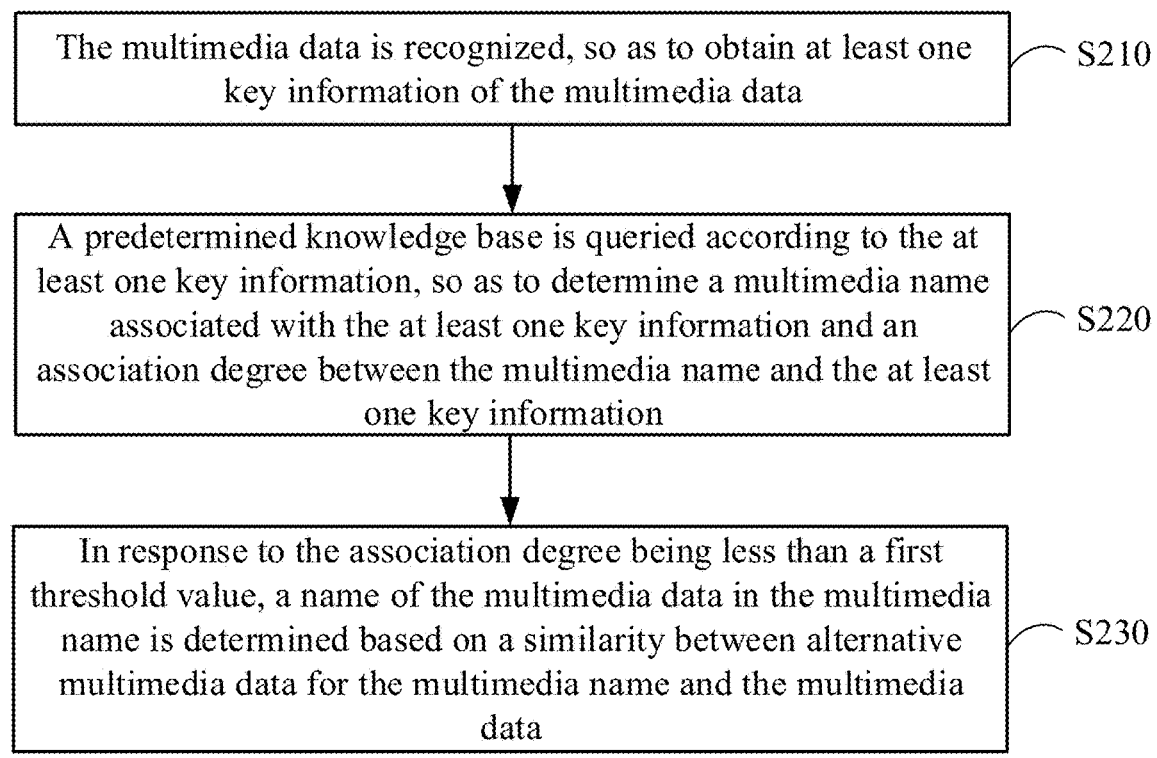
FIG. 2 shows a flowchart of a method of processing multimedia data according to an embodiment of the present disclosure.

FIG. 2 shows a schematic flowchart of a method of processing multimedia data according to an embodiment of the present disclosure.

As shown in FIG. 2, a method 200 of processing multimedia data in the embodiment may include operations S210 to S230.

In operation S210, the multimedia data is recognized, so as to obtain at least one key information of the multimedia data.

According to embodiments of the present disclosure, the multimedia data may be, for example, text data, audio data, and/or image data. For example, the multimedia data may be a video including the text data, the audio data, and the image data.

When the multimedia data is the text data, in the embodiment, a keyword, etc., extracted from the text data may be used as a key information. When the multimedia data is the audio data, in the embodiment, a keyword in a text converted from the audio data may be used as the key information. When the multimedia data is the image data, in the embodiment, an object detection may be performed on the image data, and a name of the detected object may be used as the key information.

When the multimedia data is of multiple types of data, in the embodiment, a union of information extracted from the multiple types of data may be used as the key information.

In operation S220, a predetermined knowledge base is queried according to the at least one key information, so as to determine a multimedia name associated with the at least one key information and an association degree between the multimedia name and the at least one key information.

According to embodiments of the present disclosure, it is possible to acquire, from the predetermined knowledge base, the multimedia name associated with the at least one key information, so as to obtain at least one multimedia name. If a plurality of key information exist and the multimedia name is associated with at least two key information, in the embodiment, the multimedia name associated with the plurality of key information may be de-duplicated, so as to obtain the at least one multimedia name.

For example, if the multimedia data is the text data, the multimedia name may be a title name of an article. If the multimedia data is the audio data/image data, the multimedia name may be a name of an audio/image. If the multimedia data is a film and television video, the multimedia name may be a film and television play name.

According to embodiments of the present disclosure, an association degree between the key information and the multimedia name may be maintained in the predetermined knowledge base, for example. Therefore, in the embodiment, the association degree may be directly obtained from the predetermined knowledge base. If a plurality of key information exist and the multimedia name is associated with the at least two key information, then the maximum one of association degrees between the multimedia name and the at least two key information may be used as the association degree determined in operation S220. Alternatively, the predetermined knowledge base may be a knowledge graph, for example. In the embodiment, the association degree may be determined according to a distance between the multimedia name and the key information. The closer the distance, the greater the association degree. For example, the distance between the multimedia name and the key information may be positively correlated with the hop count between the multimedia name and the key information. The hop count between the multimedia name and the key information refers to the number of edges passed from a node representing the key information as the starting point to a node representing the multimedia name.

It may be understood that each multimedia name has one association degree with the at least one key information. That is, the association degrees correspond to the multimedia names one by one.

In operation S230, in response to the association degree being less than a first threshold value, a name of the multimedia data in the multimedia name is determined based on a similarity between alternative multimedia data for the multimedia name and the multimedia data.

If an association degree greater than or equal to the first threshold value exists in the association degrees corresponding to the multimedia names one by one, a multimedia name corresponding to the association degree is used as the name of the multimedia data. If a plurality of association degrees greater than or equal to the first threshold value exist in the association degrees corresponding to the multimedia names one by one, a multimedia name corresponding to the maximum association degree is used as the name of the multimedia data. The first threshold value may be set according to actual needs, such as 0.5, 0.3, etc., which will not be limited in the present disclosure.

If no association degree greater than or equal to the first threshold value exists in the association degrees corresponding to the multimedia names one by one, the alternative multimedia data for the multimedia name may be obtained from a media library. If a plurality of multimedia names are obtained in operation S220, a plurality of groups of alternative multimedia data may be obtained, and each group of alternative multimedia data is used for one multimedia name. Each group of alternative multimedia data may include one or more multimedia data.

In the embodiment, a similarity between feature data of the multimedia data and feature data of the alternative multimedia data may be determined as the similarity between the multimedia data and the alternative multimedia data. The feature data of the multimedia data and the feature data of the alternative multimedia data may be extracted by using a neural network model. For example, a type of the neural network model may be determined according to a type of the multimedia data. If the multimedia data is a text, a neural network may be a Bidirectional Encoder Representation from Transformers (BERT) network, an Enhanced Language Representation with Information Entity (ERNIE), etc. If the multimedia data is an image, the neural network may be a Residual Network (ResNet), an Inception Network, an Extreme Inception Network (Xception), etc. If the multimedia data is an audio, the neural network may include a network (e.g., Hidden Markov Model, etc.) that converts the audio into a text, the above-mentioned BERT, ERNIE, etc., or the neural network may be a visual geometry group network (VGGish) based on a TensorFlow framework, which will not be limited in the present disclosure. A full name of the visual geometry group network is Visual Geometry Group Network, abbreviated as VGG.

After the similarity between the multimedia data and the alternative multimedia data is obtained, a multimedia name for the alternative multimedia data with the maximum similarity to the multimedia data may be used as the name of the multimedia data.

To sum up, in the method of processing the multimedia data according to embodiments of the present disclosure, an associated multimedia name may be determined by an explicit reasoning method for querying the predetermined knowledge base according to the key information, and then multimedia data for the multimedia name may be determined as the alternative multimedia data when the association degree between the multimedia name and the key information is small, which may filter out a vast majority of irrelevant data in a multimedia database. Therefore, an efficiency of determining the name of the multimedia data may be effectively improved. Furthermore, if the association degree between the multimedia name and the key information is relatively small, then the multimedia name may be determined by an implicit reasoning method of a similarity between the alternative multimedia data and to-be-processed multimedia data, which may compensate for shortcomings of the explicit reasoning method to a certain extent, so as to more accurately determine the name of the multimedia data according to the key information with an insufficient query evidence.

In an embodiment, the above-mentioned multimedia data may include an image and a text for the image. For example, the multimedia data may be a video, the image contained in the multimedia data may be a key frame in the video, and the text contained in the multimedia data may be a caption corresponding to the key frame. For example, the video may be a short video on a short video platform, and the text contained in the multimedia data may also include a title of the video, etc.

Accordingly, when obtaining the at least one key information of the multimedia data, it may be possible to recognize a target object in the image, so as to obtain an object information of the target object, while the text for the image may also be recognized, so as to obtain an entity information in the text. The obtained object information and entity information are used as the key information.

The target object in the image may be recognized by using a face detection model, etc. An input of the model is the image, and an output of the model is an object name of the target object in the image. For example, an actor in the video may be recognized, and a name of the actor may be output. The entity information in the text may be obtained by matching with an entity thesaurus or by a deep learning method. The deep learning method may include, for example, inputting a text into an entity recognition model such as a model composed of a Long-Short Term Memory Network+Conditional Random Field (LSTM+CRF), etc., and determining an entity information in the text through a label output by the entity recognition model for each word in the text. The label output by the entity recognition model may indicate whether each word in the text is an entity word or not, and a word labeled as the entity word is used as the entity information. When the multimedia data is a short video of a film and television play, the entity word recognized may include, for example, a role name, a film and television play name, etc., which will not be limited in the present disclosure.

In the embodiment, the key information of the multimedia data is obtained by combining the image and the text, which may improve a comprehensiveness of the key information obtained to a certain extent, so that a diversity and an accuracy of the multimedia name queried from the predetermined knowledge base may be improved.

Figure 3:
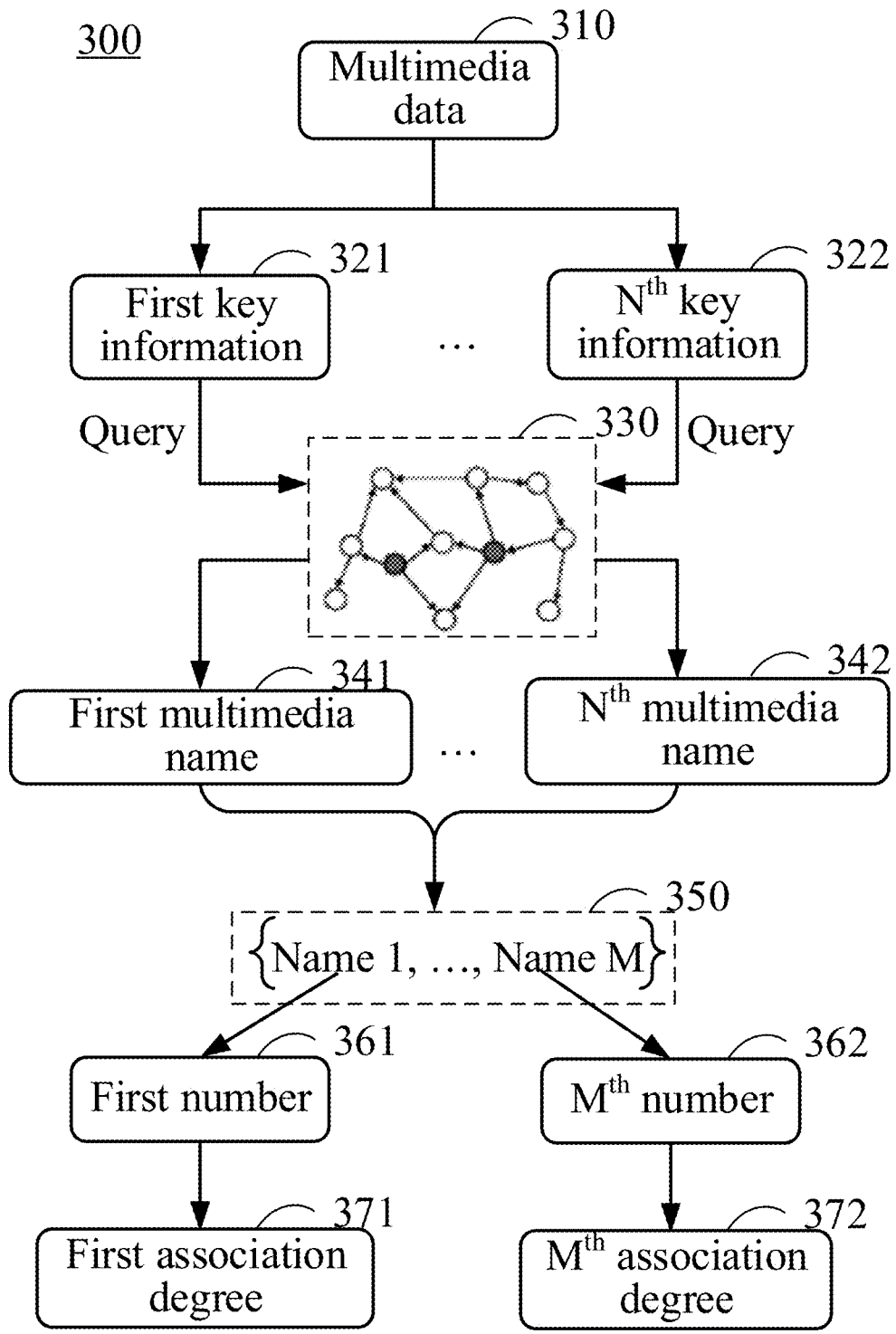
FIG. 3 shows a schematic diagram of a principle of determining a multimedia name and an association degree between the multimedia name and a key information according to an embodiment of the present disclosure.

FIG. 3 shows a schematic diagram of a principle of determining a multimedia name and an association degree between the multimedia name and a key information according to an embodiment of the present disclosure.

According to embodiments of the present disclosure, the predetermined knowledge base may include a knowledge graph, and the knowledge graph is composed of points and edges. The point represents an entity, and the edge represents a relationship between entities. For example, the entity represented by the point in the predetermined knowledge base may include: the name of the multimedia data and the key information of the multimedia data. When the multimedia data is a video, the entity represented by the point may include: an actor name, a role name, a film and television play name, etc., and may also include an animal name, a plant name, etc. The relationship represented by the edge may include a dependency, a synonymy, a correlation and/or a causality, etc. between the entities. It may be understood that the information represented by the edges and points in the knowledge graph is only used as an example in order to facilitate an understanding of the present disclosure, which will not be limited in the present disclosure.

As shown in FIG. 3, in an embodiment 300, the number of the key information of multimedia data 310 is set to N, where N may be any value greater than or equal to 2. In the embodiment 300, when determining the multimedia name and the association degree, for a first key information 321 to an $N^{th}$ key information 322 of the N key information, a knowledge graph 330 may be queried according to each key information, so as to determine a point representing each key information in the knowledge map 330 and to determine whether an information represented by a point connected with the point representing the key information includes a multimedia name or not. In a case that the information represented by the point connected with the point representing the key information includes the multimedia name, the multimedia name may be used as a multimedia name connected with the key information in the knowledge map. In this way, a first multimedia name 341 may be obtained for the first key information 321, and an $N^{th}$ multimedia name 342 may be obtained for the $N^{th}$ key information 322. At least one multimedia name connected to each key information may exist, which will not be limited in the present disclosure.

In the embodiment, all multimedia names connected with the N key information may be aggregated, and a deduplication operation may be performed to obtain a set of multimedia names 350 as the above-mentioned multimedia name associated with the at least one key information. For example, the set of multimedia names 350 may include a total of M names containing "Name 1", . . . , "Name M". Then, for each name of the set of multimedia names 350, the number of the key information connected to each name in the N key information is determined. For example, if it is determined that a multimedia name connected with a key information "Actor a" in the knowledge map includes "TV play A", and a multimedia name connected with a key information "Role b" in the knowledge map also includes the "TV play A", then for the name "TV play A", the number of the key information connected is determined to be 2. For example, the number of key information connected with "Name 1" in the set of multimedia names 350 is a first number 361, . . . , and the number of key information connected with "Name M" is a $M^{th}$ number 362, and thus there are M numbers in total. M is an integer greater than or equal to 2, and M may be less than or equal to N or greater than N.

In an example, all the multimedia names associated with the N key information may also be aggregated, so as to obtain a group of multimedia names, and names in the group of multimedia names may be classified, and the same names are classified into one category. In the embodiment, the number of names in each category of names may be determined, and the number is equal to the number of the key information connected to the name determined as described above.

Then, an association degree between each name and the at least two key information may be determined according to the M numbers. For example, a first association degree 371 between the "name 1" and the at least two key information may be obtained, and an $M^{th}$ association degree 372 between the "name M" and the at least two key information may be obtained, so that M association degrees are obtained. And the multimedia name and the association degree are determined.

For example, in the embodiment, a sum of the M numbers may be calculated, and then a ratio of the $j^{th}$ number to the sum is used as an association degree between the $j^{th}$ name among the M names and the N key information, where j is an integer greater than or equal to 1 and less than or equal to M. For example, if $n_j$ is set as a value of the $j^{th}$ number, an association degree $P_j$ between the $j^{th}$ name and the N key information may be expressed as:

$$P_j = \frac{n_j}{\sum_{j=1}^{M} n_j}.$$

The association degree is determined by using the above-mentioned method, so that the determined association degree may more closely express the association relationship between the multimedia name and the multimedia data determined from the knowledge graph. Therefore, in a case that the association degree greater than or equal to the first threshold value exists in the M association degrees, an accuracy of the determined name of the multimedia data may be improved.

Figure 4:
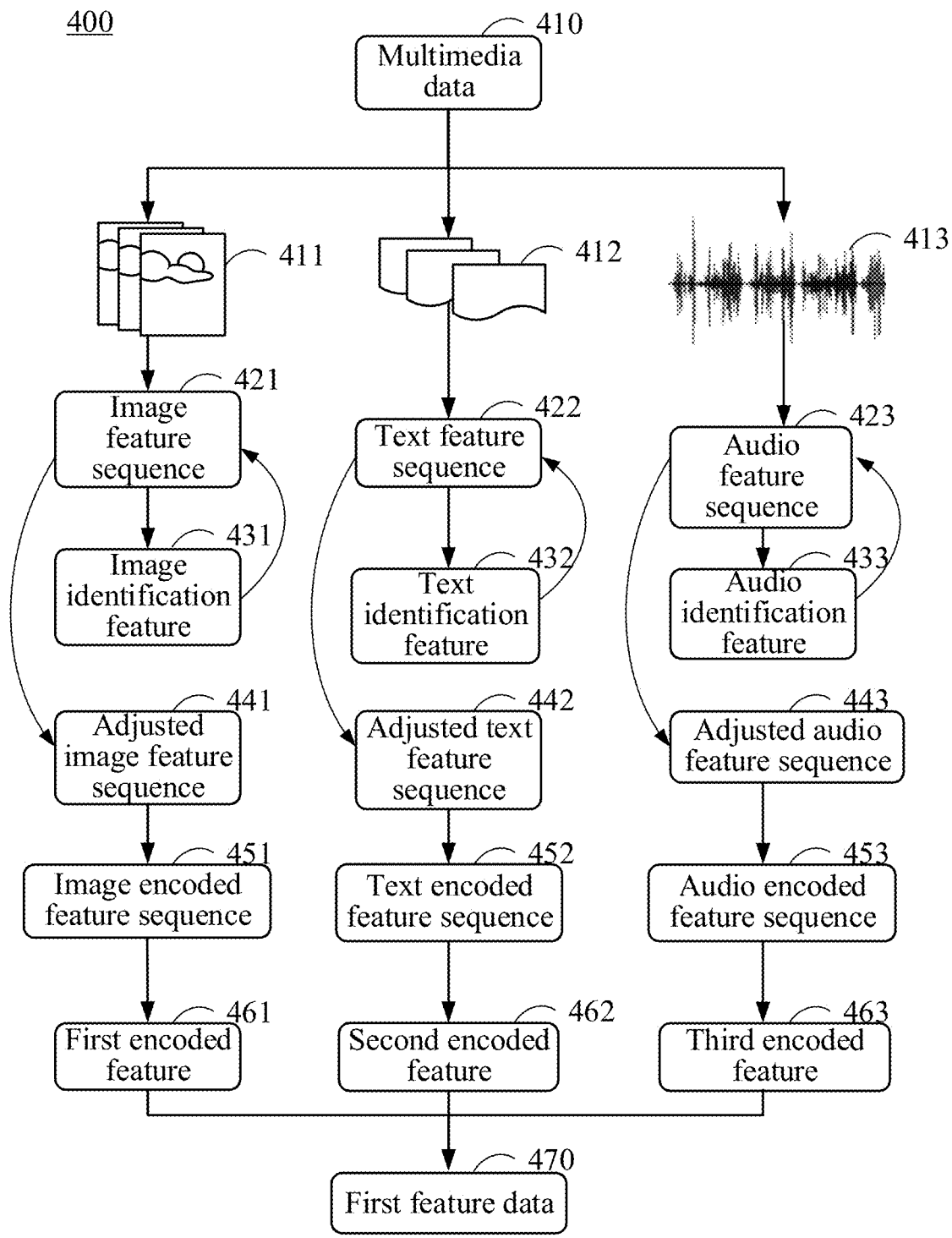
FIG. 4 shows a schematic diagram of a principle of obtaining first feature data according to an embodiment of the present disclosure.

FIG. 4 shows a schematic diagram of a principle of obtaining first feature data according to an embodiment of the present disclosure.

According to embodiments of the present disclosure, when determining a name of the multimedia data in the multimedia name, the multimedia data may be encoded to obtain the first feature data of the multimedia data. Then, a similarity between second feature data of each alternative multimedia data and the first feature data is determined. And then, it may be possible to determine, from a plurality of alternative multimedia data, the alternative multimedia data whose similarity between the second feature data and the first feature data is greater than or equal to a second threshold value as the target data. And a multimedia name for the target data is used as the name of the multimedia data.

In an embodiment, the multimedia data may include, for example, data of at least one selected: an image modality, a text modality, and/or an audio modality. For example, the multimedia data may be video data, and the video data includes a plurality of consecutive video frames (i.e., data of the image modality), a plurality of consecutive texts (data of the text modality), and a plurality of consecutive audio segments (i.e., data of the audio modality). In the embodiment, the data of the at least one modality may be encoded by using the neural network model determined according to the type of the multimedia data described above, so as to obtain at least one feature sequence corresponding to the at least one modality respectively. Then, features in the at least one feature sequence are fused to obtain the first feature data. The plurality of consecutive texts may be a plurality of sentence texts in a caption, and the plurality of consecutive audio segments may be audio segments corresponding to the plurality of sentence texts.

For example, when fusing the features in the at least one feature sequence, features included in each feature sequence may be fused so as to obtain a target feature for the feature sequence. Then, the first feature data is obtained according to the target feature for each feature sequence.

As shown in FIG. 4, in an embodiment 400, taking the multimedia data 410 including a plurality of consecutive video frames 411, a plurality of consecutive texts 412, and a plurality of consecutive audio segments 413 as an example, an image feature sequence 421 may be obtained by encoding the plurality of video frames 411, a text feature sequence 422 may be obtained by encoding the plurality of texts 412, and an audio feature sequence 423 may be obtained by encoding the plurality of audio segments 413. Each feature in the image feature sequence 421 corresponds to one video frame, each feature in the text feature sequence 422 corresponds to one text, and each feature in the audio feature sequence 423 corresponds to one audio segment.

For example, for each feature sequence, a plurality of features in the feature sequence may be fused to obtain the target feature for one modality. Then, at least one target feature for the at least one modality may be concatenated to obtain the first feature data. When fusing the plurality of features in each feature sequence, the plurality of features may be concatenated, and then the concatenated features may be processed through a multi-layer perceptron, so that a feature for one modality may be obtained. Alternatively, each feature sequence may be input into a recurrent neural network for encoding, and a feature output by the recurrent neural network may be used as the feature for one modality. For example, the recurrent neural network may be an LSTM network or an encoding network based on an attention mechanism. In an embodiment, each feature sequence may be encoded by using an encoder of a Transformer network.

In the embodiment, the target feature is obtained by fusing the plurality of features in each feature sequence, and the first feature data is obtained according to the target feature, which may improve an expression ability of the first feature data to a certain extent, so that the first feature data may express a context information of the multimedia data. Based on this, an accuracy of the determined name of the multimedia data may be improved.

In an embodiment, before encoding each feature sequence, a pooling operation may also be performed on the features included in each feature sequence, so as to obtain an identification feature for each feature sequence. For example, for the image feature sequence 421, an image identification feature 431 may be obtained through the pooling operation. For the text feature sequence 422, a text identification feature 432 may be obtained through the pooling operation. For the audio feature sequence 423, an audio identification feature 433 may be obtained through the pooling operation. The pooling operation may include, for example, a max-pooling operation or mean-pooling operation. The identification feature obtained through the pooling operation may represent each feature in the feature sequence to a certain extent.

After the identification feature of each feature sequence is obtained, the identification feature may be added to the feature sequence, so as to obtain an adjusted feature sequence. For example, the identification feature may be added to the first place of each feature sequence. For the image feature sequence 421, an adjusted image feature sequence 441 may be obtained by adding the image identification feature 431. For the text feature sequence 422, an adjusted text feature sequence 442 may be obtained by adding the text identification feature 432. For the audio feature sequence 423, an adjusted audio feature sequence 443 may be obtained by adding the audio identification feature 433.

After the adjusted feature sequence is obtained, the adjusted feature sequence may be encoded by using an encoding network, so as to obtain an encoded feature sequence for each feature sequence. The encoding network may be the recurrent neural network described above. For example, in the embodiment, the encoding network based on the attention mechanism may be used, so as to improve an expression ability of the obtained encoded feature sequence, so that the encoded feature sequence may express a longer context information. For example, an image encoded feature sequence 451 may be obtained after encoding the adjusted image feature sequence 441 through the encoding network. A text encoded feature sequence 452 may be obtained after encoding the adjusted text feature sequence 442 through the encoding network. An audio encoded feature sequence 453 may be obtained after encoding the adjusted audio feature sequence 443 through the encoding network.

After the encoded feature sequence for each feature sequence is obtained, the feature data of the multimedia data may be determined based on an encoded feature, in the encoded feature sequence, corresponding to the identification feature. For example, a first encoded feature 461 in the image encoded feature sequence 451 corresponding to the image identification feature 431, a second encoded feature 462 in the text encoded feature sequence 452 corresponding to the text identification feature 432, and a third encoded feature 463 in the audio encoded feature sequence 453 corresponding to the audio identification feature 433 are concatenated, so as to obtain first feature data 470.

In an embodiment, each feature sequence may be encoded by using the encoding network, so as to obtain an encoded feature sequence. Then, the pooling operation is performed on the features included in the encoded feature sequence, so as to obtain the identification feature for each feature sequence. Then, at least one identification feature for the at least one feature sequence are concatenated, so as to obtain the first feature data.

In embodiments of the present disclosure, the identification feature is obtained by performing the pooling operation on the features, and the first feature data is obtained according to the identification feature, which may reduce a data amount of the first feature data while ensuring the expression ability of the first feature data.

Figure 5:
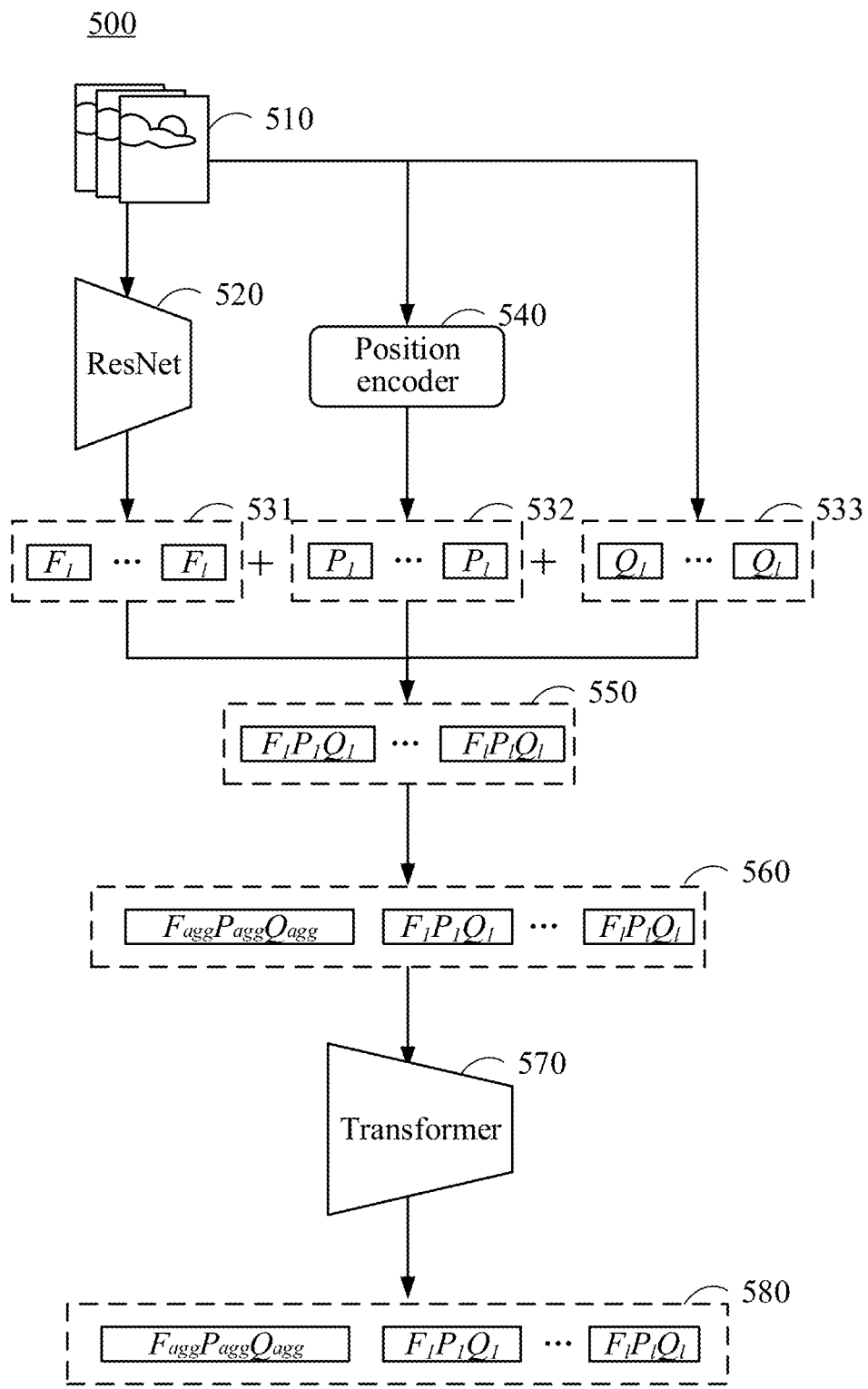
FIG. 5 shows a schematic diagram of a principle of obtaining a target feature of each feature sequence according to an embodiment of the present disclosure.

FIG. 5 shows a schematic diagram of a principle of obtaining a target feature of each feature sequence according to an embodiment of the present disclosure.

In an embodiment, when obtaining a feature sequence of each modality, in addition to encoding the data of each modality by using the neural network model determined according to the type of the multimedia data described above, for example, the data of each modality may be assigned with a position code, so that when fusing the features in the feature sequence of each modality, a context information of the data of each modality may be learned better by using the position code, and thus an accuracy of the target feature of each feature sequence may be improved.

In an embodiment, when obtaining the feature sequence of each modality, the data of each modality may be assigned with a code that uniquely represents the modality. In this way, a unique identifier may be added to the target feature of each feature sequence, so that when obtaining the first feature data, an order of concatenating target features of the at least one feature sequence may be determined.

As shown in FIG. 5, in an embodiment 500, when obtaining at least one feature sequence corresponding to the at least one modality respectively, for each modality, data 510 of each modality may be encoded by using an encoder 520 matched with the modality, so as to obtain a feature sequence as a first sub feature sequence 531. Taking the data 510 of each modality as the plurality of consecutive video frames as an example, the image feature sequence may be obtained by using a ResNet network as the encoder to encode the plurality of consecutive video frames. For example, the first sub feature sequence 531 may be expressed as: $[F_1, \ldots, F_l]$, where/is the number of the plurality of video frames, while the data of each modality may be encoded by using a position encoder 540, so as to obtain a feature sequence as a second sub feature sequence 532. For example, the position encoder 540 may encode the data of each modality by using a sine/cosine position encoding method. For example, the second sub feature sequence 532 may be expressed as: $[P_1, \ldots, P_l]$. In addition, a modal feature may also be randomly assigned to the data of each modality, so as to obtain a feature sequence as a third sub feature sequence 533. The modal feature may be assigned by using a random initialization method. For example, the third sub feature sequence 533 may be expressed as: $[Q_1, \ldots, Q_l]$. Dimensions of the three sub feature sequences obtained may be equal to each other.

Then, in the embodiment, the first sub feature sequence 531, the second sub feature sequence 532, and the third sub feature sequence 533 may be concatenated so as to obtain a feature sequence 550 corresponding to each modality. For example, the obtained feature sequence 550 corresponding to each modality may be expressed as: $[F_1 P_1 Q_1, \ldots, F_l P_l Q_l]$.

In the embodiment, when the pooling operation is performed on the feature sequence 550, for example, the pooling operation may be performed on the first sub feature sequence 531, the second sub feature sequence 532 and the third sub feature sequence 533, respectively, so as to obtain an identification feature of each of the first sub feature sequence 531, the second sub feature sequence 532 and the third sub feature sequence 533. The identification features are added to respective sub feature sequences, so as to obtain three adjusted sub feature sequences $F_{agg}$, $P_{agg}$, $Q_{agg}$. Then, the three adjusted sub feature sequences are concatenated so as to obtain the adjusted feature sequence. Alternatively, the pooling operation may be directly performed on the feature sequence 550 obtained by concatenating the three sub feature sequences, and the identification feature obtained by the pooling operation may be added to the feature sequence 550, so as to obtain an adjusted feature sequence 560. For example, the adjusted feature sequence 560 may be expressed as: $[F_{agg} P_{agg} Q_{agg}, F_1 P_1 Q_1, \ldots, F_l P_l Q_l]$. Then, the adjusted feature sequence 560 is input into an encoding network 570 of Transformer, so as to obtain an encoded feature sequence 580. For example, the encoded feature sequence 580 may be expressed as: $[H_{agg}, H_1, \ldots, H_l]$. In the embodiment, the feature $H_{agg}$ in the encoded feature sequence may be used as a target feature of the image feature sequence.

A target feature of the text feature sequence and a target feature of the audio feature sequence may be obtained by using a principle similar to that shown in FIG. 5. In the embodiment, the three target features may be concatenated so as to obtain the first feature data.

Figure 6:
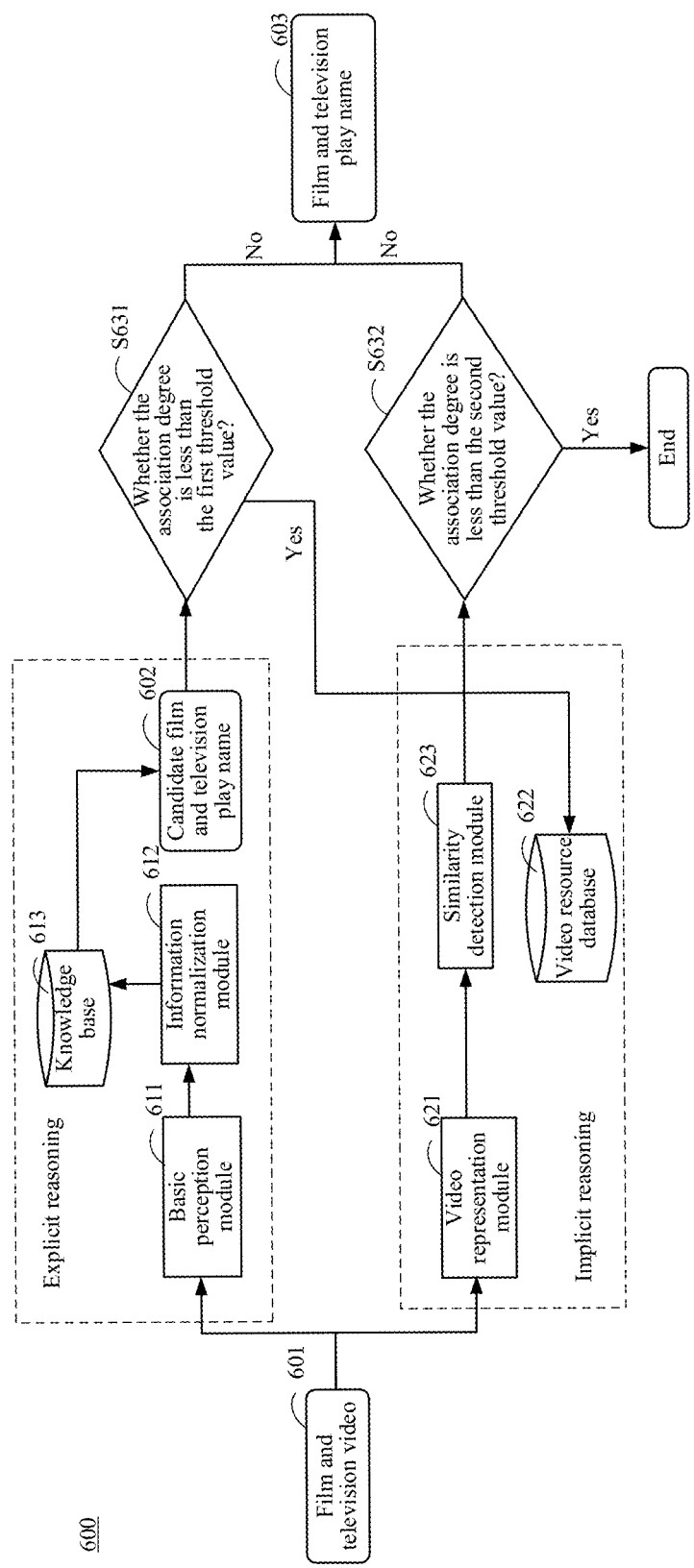
FIG. 6 shows a schematic diagram of a principle of a method of processing multimedia data according to an embodiment of the present disclosure.

FIG. 6 shows a schematic diagram of a principle of a method of processing multimedia data according to an embodiment of the present disclosure.

As shown in FIG. 6, taking the multimedia data as a film and television video as an example, in an embodiment 600, multimedia data 601 may be processed in combination with an explicit reasoning method and an implicit reasoning method.

For example, a name of the multimedia data 601 is determined by the explicit reasoning method, and the name is a movie and television play name. When the name of the multimedia data 601 may not be determined by the explicit reasoning method, the name of the multimedia data 601 may be determined by the implicit reasoning method.

In the explicit reasoning method, the multimedia data 601 may be recognized by using a basic perception module 611, so as to obtain at least one key information. The basic perception module 611 may be used for a face recognition and an entity recognition. Then, a deduplication operation is performed on the obtained key information by using an information normalization module 612, and a predetermined knowledge base 613 may be queried by using the key information after the deduplication operation, so as to obtain a multimedia name associated with the key information after the deduplication operation as a candidate film and television play name 602, while an association degree for each candidate film and television play name may be obtained by using the method described above.

Then, whether the association degree is less than the first threshold value may be determined in operation S631. If a candidate film and television play name whose association degree is greater than or equal to the first threshold value exists, then the candidate film and television play name is used as the name of the multimedia data 601, that is, the candidate film and television play name is output as a film and television play name 603. If the association degree for each candidate film and television play name is less than the first threshold value, the name of the multimedia data 601 may be determined by the implicit reasoning method.

When the name is determined by the implicit reasoning method, the multimedia data 601 may be encoded by using a video representation module 621, so as to obtain first feature data of the multimedia data 601. The video representation module 621 may obtain the first feature data by using the method described above, while a video resource database 622 may be queried according to the candidate film and television play name 602, so as to acquire second feature data of the alternative multimedia data for the candidate film and television play name 602. Then, the similarity between the first feature data and the second feature data is detected by a similarity detection module 623. After the similarity is obtained by detecting, it may be determined in operation S632 whether feature data whose similarity with the first feature data is greater than or equal to the second threshold value exists in the second feature data. If the feature data whose similarity with the first feature data is greater than or equal to the second threshold value exists in the second feature data, a candidate movie and television play name of the second feature data obtained by querying is output as the name of the multimedia data 601. Otherwise, a process of determining the name of the multimedia data by reasoning ends. After the reasoning process ends, the name of the multimedia data may be determined manually, for example.

Figure 7:
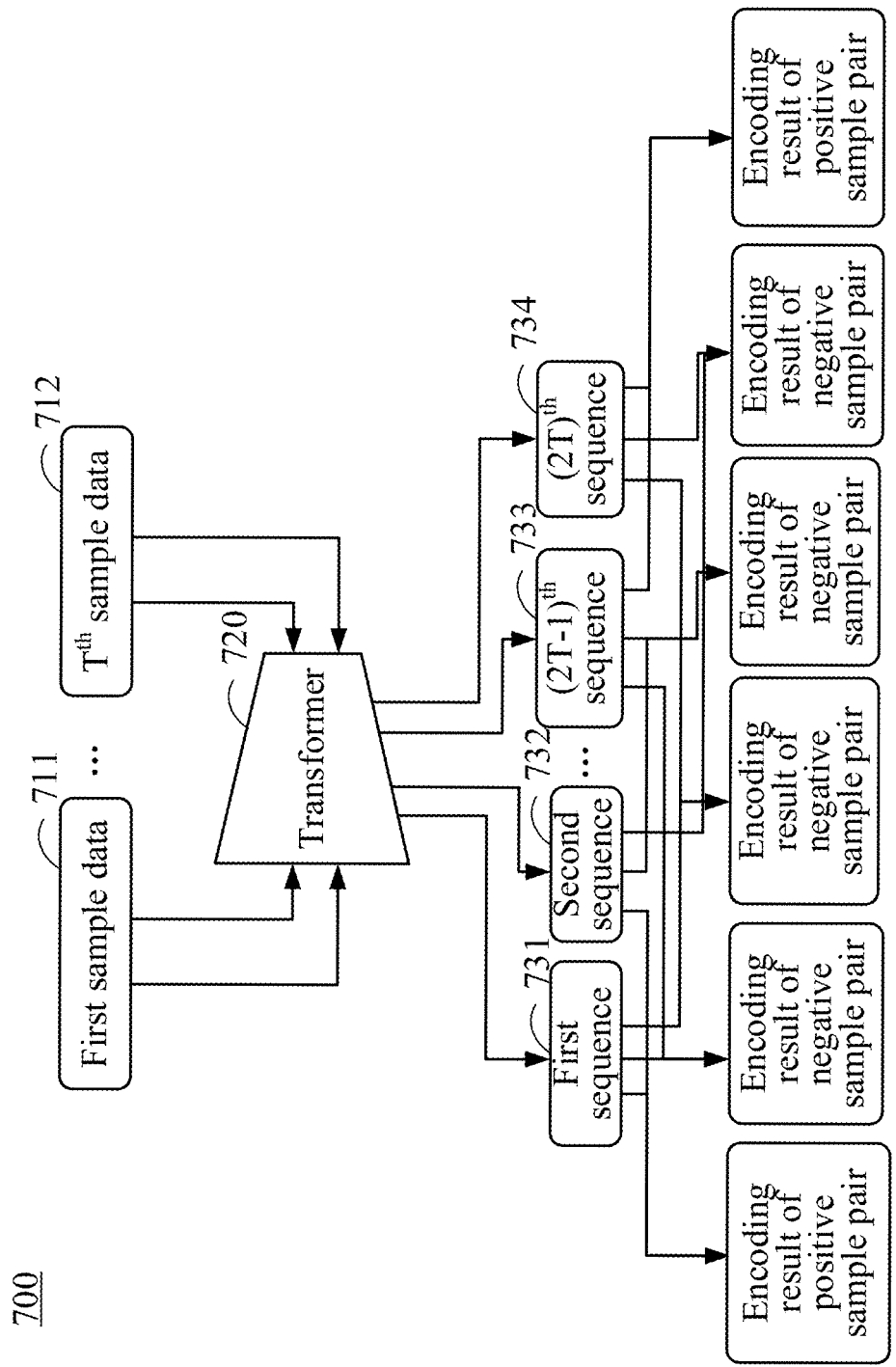
FIG. 7 shows a schematic diagram of a principle of training an encoding network according to an embodiment of the present disclosure.

FIG. 7 shows a schematic diagram of a principle of training an encoding network according to an embodiment of the present disclosure.

According to embodiments of the present disclosure, before encoding the feature sequence by using the above-mentioned encoding network, in the embodiment, the encoding network may be trained so as to improve an accuracy of the feature encoded by the encoding network.

According to embodiments of the present disclosure, for example, the encoding network may be trained using an unsupervised contrastive learning mechanism. Using the unsupervised mechanism to train the encoding network may omit a process of labeling a sample, thereby reducing a training cost to a certain extent.

In an embodiment, the encoding network may include, for example, a Dropout layer, and the Dropout layer is used to perform subtle transformations on the feature obtained by the encoding network by using a Dropout function. Specifically, the Dropout layer may temporarily discard some neural network units in the encoding network according to a certain probability. By providing the Dropout layer, in order to achieve an unsupervised training, in the embodiment, a sample pair formed by the same sample data and itself may be used as a positive sample pair, and a sample pair formed by different two sample data is used as a negative sample pair. A label of the positive sample pair is 1, indicating that an actual similarity between two encoded feature sequences obtained by encoding two sample data in the positive sample pair is 1. A label of the negative sample pair is 0, indicating that an actual similarity between two encoded feature sequences obtained by encoding two sample data in the negative sample pair is 0.

In this way, in the embodiment, when training the encoding network, a loss of the encoding network may be set to be negatively correlated with a similarity between two encoded feature sequences obtained by processing the positive sample pair, and positively correlated with a similarity between two encoded feature sequences obtained by processing the negative sample pair.

In an embodiment, when training the encoding network, for sample data in a batch, two encoded feature sequences obtained by encoding the adjusted feature sequence of the same sample data twice through the encoding network may be used as the two encoded feature sequences of the positive sample pair. Two encoded feature sequences obtained by encoding adjusted feature sequences of different sample data through the encoding network may be used as the two encoded feature sequences of the negative sample pair.

For example, as shown in FIG. 7, in an embodiment 700, when training the encoding network, for the sample data in a batch (taking a total of T sample data including the first sample data 711 to the $T^{th}$ sample data 712 as an example), an $i^{th}$ sample data in the sample data in a batch is encoded twice through the encoding network (taking an encoder 720 of the Transformer network as an example), so that encoded feature sequences $h_i^\alpha$ and $h_i^{3-\alpha}$ may be obtained respectively, where a value of $\alpha$ is 1 or 2, and i is an integer greater than or equal to 1 and less than or equal to T. For example, after the first sample data 711 is encoded twice successively via the encoder 720 of the Transformer network, the encoded feature sequences $h_1^\alpha$ and $h_1^{3-\alpha}$ may be obtained as a first sequence 731 and a second sequence 732, respectively. After the $T^{th}$ sample data 712 is encoded twice successively via the encoder 720 of the Transformer network, the encoded feature sequences $h_T^\alpha$ and $h_T^{3-\alpha}$ may be obtained as a $(2T-1)^{th}$ sequence 733 and a $(2T)^{th}$ sequence 734, respectively, so that a total of 2T sequences may be obtained from T sample data. A loss of the encoding network 720 is calculated by arbitrarily combining the 2T sequences, and using a combination of a $(2i-1)^{th}$ sequence and a $2i^{th}$ sequence in any combinations as an encoding result of the positive sample pair and a remaining combination as an encoding result of the negative sample pair. For example, a combination of the first sequence 731 and the second sequence 732, ..., and a combination of the $(2T-1)^{th}$ sequence 733 and the $(2T)^{th}$ sequence 734 may be used as T encoding results of the positive sample pairs, and a combination of the first sequence 731 and the $(2T-1)^{th}$ sequence 733, a combination of the second sequence 732 and the $(2T-1)^{th}$ sequence 733, a combination of the first sequence 731 and the $(2T)^{th}$ sequence 734, ..., and a combination of the second sequence 732 and the $(2T)^{th}$ sequence 734 are used as T(2T−2) encoding results of the negative sample pairs.

In an embodiment, the loss of the encoding network is expressed by the following function:

$$\text{loss} = -\sum_{i=1}^{T}\sum_{\alpha=1,2} \log \frac{e^{\cos(h_i^\alpha, h_i^{3-\alpha})/\tau}}{\sum_{j=1, j\neq i}^{T} e^{\cos(h_i^\alpha, h_j^\alpha)/\tau} + \sum_{j=1}^{T} e^{\cos(h_i^\alpha, h_j^{3-\alpha})/\tau}},$$

where, $h_i^\alpha$ indicates an encoded feature sequence obtained by the $\alpha^{th}$ encoding of an adjusted feature sequence of the $i^{th}$ sample data, $h_i^{3-\alpha}$ indicates an encoded feature sequence obtained by the $(3-\alpha)^{th}$ encoding of the adjusted feature sequence of the $j^{th}$ sample data, T is the number of sample data, and $\tau$ is a hyperparameter.

Based on the method of processing the multimedia data provided by the present disclosure, the present disclosure further provides an apparatus of processing multimedia data. The apparatus will be described in detail below with reference to FIG. 8.

Figure 8:
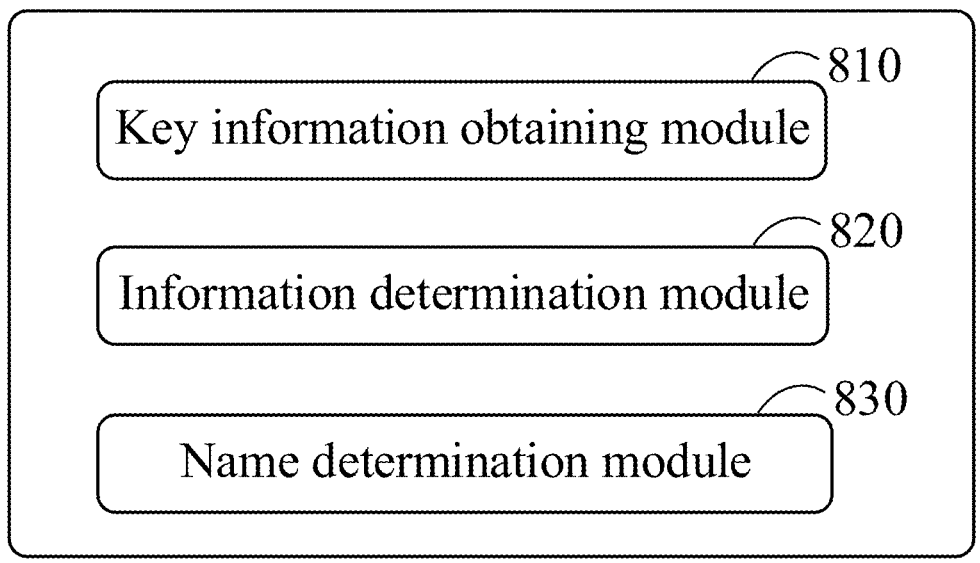
FIG. 8 shows a structural block diagram of an apparatus of processing multimedia data according to an embodiment of the present disclosure.

FIG. 8 shows a structural block diagram of an apparatus of processing multimedia data according to an embodiment of the present disclosure.

As shown in FIG. 8, an apparatus 800 of processing multimedia data in the embodiment may include a key information obtaining module 810, an information determination module 820, and a name determination module 830.

The key information obtaining module 810 is used to recognize the multimedia data, so as to obtain at least one key information of the multimedia data. In an embodiment, the key information obtaining module 810 may be used to perform the operation S210 described above, which will not be repeated here.

The information determination module 820 is used to query a predetermined knowledge base according to the at least one key information, so as to determine a multimedia name associated with the at least one key information and an association degree between the multimedia name and the at least one key information. In an embodiment, the information determination module 820 may be used to perform the operation S220 described above, which will not be repeated here.

The name determination module 830 is used to determine, in the multimedia name, a name of the multimedia data based on a similarity between alternative multimedia data for the multimedia name and the multimedia data, in response to the association degree being less than a first threshold value. In an embodiment, the name determination module 830 may be used to perform the operation S230 described above, which will not be repeated here.

According to embodiments of the present disclosure, the multimedia data includes an image and a text for the image. The above-mentioned key information obtaining module 810 may include an image recognition sub module and a text recognition sub module. The image recognition sub module is used to recognize a target object in the image, so as to obtain an object information of the target object. The text recognition sub module is used to recognize a text for the image, so as to obtain an entity information in the text. The at least one key information includes the entity information and the object information.

According to embodiments of the present disclosure, a number of the at least one key information is at least two, and the predetermined knowledge base includes a knowledge graph. The above-mentioned information determination module 820 may include a first name determination sub module, a number determination sub module, and an association degree sub module. The first name determination sub module is used to determine, in the knowledge graph, a multimedia name connected with each key information of at least two key information. The number determination sub module is used to determine, for each name in the multimedia name, a number of key information connected to each name in the at least two key information. The association degree determination sub module is used to determine an association degree between each name and the at least two key information according to the number of the key information. The knowledge graph includes a plurality of points and a plurality of edges connecting the points, and the plurality of points include points representing the at least two key information and points representing the multimedia name.

According to embodiments of the present disclosure, a plurality of alternative multimedia data exist, and the above-mentioned name determination module 830 may include an encoding sub module, a similarity determination sub module, and a second name determination sub module. The encoding sub module is used to encode the multimedia data, so as to obtain first feature data of the multimedia data. The similarity determination sub module is used to determine a similarity between second feature data of each of the plurality of alternative multimedia data and the first feature data. The second name determination sub module is used to determine a multimedia name for target data as the name of the multimedia data, in response to the target data existing in the plurality of alternative multimedia data, where a similarity between second feature data of the target data and the first feature data is greater than or equal to a second threshold value.

According to an embodiment of the present disclosure, the multimedia data includes data of at least one selected from: an image modality, a text modality and an audio modality. The above-mentioned encoding sub module may include an encoding unit, a fusion unit and a feature determination unit. The encoding unit is used to encode the data of the at least one modality, so as to obtain at least one feature sequence corresponding to the at least one modality respectively. The fusion unit is used to fuse features included in each feature sequence of the at least one feature sequence, so as to obtain a target feature for each feature sequence. The feature determination unit is used to determine the first feature data according to the target feature for each feature sequence.

According to embodiments of the present disclosure, the fusion unit may include a pooling sub unit, an addition sub unit, a first encoding sub unit and a determining sub unit. The pooling subunit is used to perform a pooling operation on the features included in each feature sequence, so as to obtain an identification feature for each feature sequence. The addition sub unit is used to add the identification feature to the each feature sequence, so as to obtain an adjusted feature sequence. The first encoding sub unit is used to encode, by using an encoding network, the adjusted feature sequence, so as to obtain an encoded feature sequence for each feature sequence. The determination sub unit is used to determine an encoded feature in the encoded feature sequence corresponding to the identification feature as the target feature. The encoding network is an encoding network based on an attention mechanism.

According to embodiments of the present disclosure, the encoding unit may include a second encoding sub unit, a third encoding sub unit, a feature assignment sub unit and a concatenating sub unit. The second encoding sub unit is used to encode, for each modality of the at least one modality, the data of each modality by using an encoder matched with each modality, so as to obtain a first sub feature sequence. The third encoding sub unit is used to encode, by using a position encoder, the data of each modality, so as to obtain a second sub feature sequence. The feature assignment sub element is used to randomly assign a modal feature to the data of each modality, so as to obtain a third sub feature sequence. The concatenating sub unit is used to concatenate the first sub feature sequence, the second sub feature sequence and the third sub feature sequence, so as to obtain a feature sequence corresponding to each modality. The modal feature is used to represent each modality.

According to an embodiment of the present disclosure, the encoding network includes a Dropout layer. When training the encoding network, a loss of the encoding network is negatively correlated with a similarity between two encoded feature sequences obtained by encoding an adjusted feature sequence of the same sample data twice, and is positively correlated with a similarity between two encoded feature sequences obtained by encoding adjusted feature sequences of two different sample data.

It should be noted that, in the technical solution of the present disclosure, an acquisition, a collection, a storage, a use, a processing, a transmission, a provision and a disclosure of multimedia information involved comply with provisions of relevant laws and regulations, and do not violate public order and good custom According to embodiments of the present disclosure, the present disclosure further provides an electronic device, a readable storage medium, and a computer program product.

Figure 9:
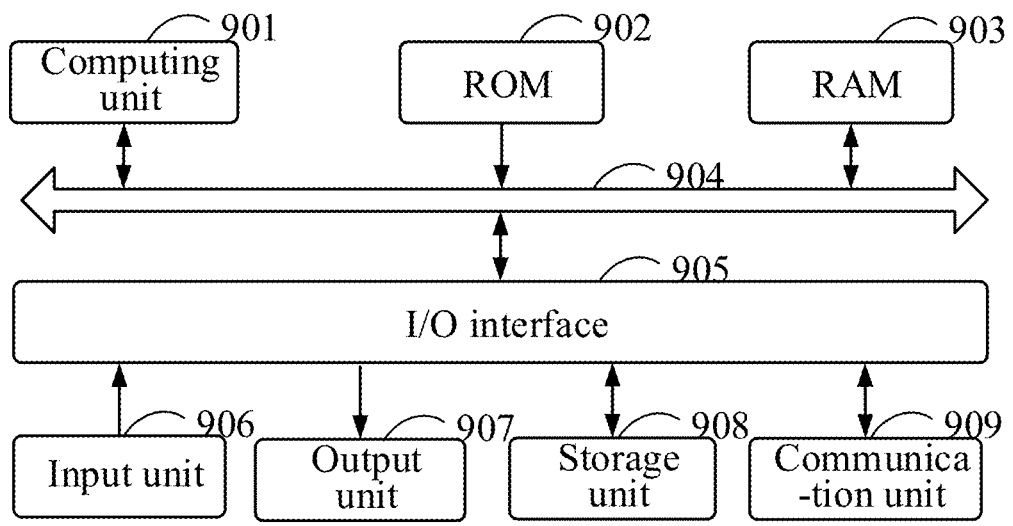
FIG. 9 shows a structural block diagram of an electronic device for implementing a method of processing multimedia data according to an embodiment of the present disclosure.

FIG. 9 shows a schematic block diagram of an exemplary electronic device 900 for implementing the method of processing the multimedia data according to embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 9, the electronic device 900 includes a computing unit 901 which may perform various appropriate actions and processes according to a computer program stored in a read only memory (ROM) 902 or a computer program loaded from a storage unit 908 into a random access memory (RAM) 903. In the RAM 903, various programs and data necessary for an operation of the electronic device 900 may also be stored. The computing unit 901, the ROM 902 and the RAM 903 are connected to each other through a bus 904. An input/output (I/O) interface 905 is also connected to the bus 904.

A plurality of components in the electronic device 900 are connected to the I/O interface 905, including: an input unit 906, such as a keyboard, or a mouse; an output unit 907, such as displays or speakers of various types; a storage unit 908, such as a disk, or an optical disc; and a communication unit 909, such as a network card, a modem, or a wireless communication transceiver. The communication unit 909 allows the electronic device 900 to exchange information/data with other devices through a computer network such as Internet and/or various telecommunication networks.

The computing unit 901 may be various general-purpose and/or dedicated processing assemblies having processing and computing capabilities. Some examples of the computing units 901 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 901 executes various methods and steps described above, such as the method of processing the multimedia data. For example, in some embodiments, the method of processing the multimedia data may be implemented as a computer software program which is tangibly embodied in a machine-readable medium, such as the storage unit 908. In some embodiments, the computer program may be partially or entirely loaded and/or installed in the electronic device 900 via the ROM 902 and/or the communication unit 909. The computer program, when loaded in the RAM 903 and executed by the computing unit 901, may execute one or more steps in the method of processing the multimedia data described above. Alternatively, in other embodiments, the computing unit 901 may be configured to perform the method of processing the multimedia data by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

A computer system may include a client and a server. The client and the server are generally far away from each other and usually interact through a communication network. The relationship between the client and the server is generated through computer programs running on the corresponding computers and having a client-server relationship with each other. The server may be a cloud server, which is also known as a cloud computing server or cloud host, and may be a host product in a cloud computing service system, so as to solve problems of a difficult management and a weak business scalability in a traditional physical host and a VPS service ("Virtual Private Server", or "VPS" for short). The server may also be a server of a distributed system, or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of processing multimedia data wherein a plurality of alternative multimedia data exist and wherein the multimedia data comprises data of at least one selected from: an image modality, a text modality, or an audio modality, the method comprising:
  recognizing the multimedia data so as to obtain at least one key information of the multimedia data;
  querying a predetermined knowledge base according to the at least one key information, so as to determine a multimedia name associated with the at least one key information and an association degree between the multimedia name and the at least one key information; and determining, in the multimedia name, a name of the multimedia data based on a similarity between alternative multimedia data for the multimedia name and the multimedia data, in response to the association degree being less than a first threshold value, wherein the determining the name of the multimedia data comprises:

encoding the multimedia data so as to obtain first feature data of the multimedia data;

determining a similarity between second feature data of each of the plurality of alternative multimedia data and the first feature data; and determining a multimedia name for target data as the name of the multimedia data, in response to the target data existing in the plurality of alternative multimedia data, wherein a similarity between second feature data of the target data and the first feature data is greater than or equal to a second threshold value, wherein the encoding the multimedia data comprises:

encoding the data of the at least one modality, so as to obtain at least one feature sequence corresponding to the at least one modality respectively;

fusing features contained in each feature sequence of the at least one feature sequence, so as to obtain a target feature for each feature sequence; and determining the first feature data according to the target feature for each feature sequence, and wherein the encoding the data of the at least one modality comprises:

encoding data of each modality of the at least one modality by using an encoder matched with the modality, so as to obtain a first sub feature sequence;

encoding the data of each modality by using a position encoder, so as to obtain a second sub feature sequence;

randomly assigning a modal feature to the data of each modality, so as to obtain a third sub feature sequence; and concatenating the first sub feature sequence, the second sub feature sequence and the third sub feature sequence, so as to obtain a feature sequence corresponding to each modality, wherein the modal feature is configured to represent each modality.

2. The method according to claim 1, wherein the multimedia data comprises an image and a text for the image, and the recognizing the multimedia data so as to obtain at least one key information of the multimedia data comprises:

recognizing a target object in the image so as to obtain an object information of the target object; and recognizing the text for the image so as to obtain an entity information in the text, wherein the at least one key information comprises the entity information and the object information.

3. The method according to claim 1, wherein a number of the at least one key information is at least two, and the predetermined knowledge base comprises a knowledge graph, and wherein the determining a multimedia name associated with the at least one key information and an association degree between the multimedia name and the at least one key information comprises:

determining, from the knowledge graph, a multimedia name connected with each key information of at least two key information;

determining, for each name in the multimedia name, a number of key information connected to each name in the at least two key information; and determining an association degree between each name and the at least two key information according to the number of the key information, wherein the knowledge graph comprises a plurality of points and a plurality of edges connecting the points, and the plurality of points comprise points representing the at least two key information and points representing the multimedia name.

4. The method according to claim 1, wherein the fusing features contained in each feature sequence so as to obtain the target feature for each feature sequence comprises:

performing a pooling operation on the features contained in each feature sequence, so as to obtain an identification feature for the feature sequence;

adding the identification feature to the feature sequence, so as to obtain an adjusted feature sequence;

encoding, by using an encoding network, the adjusted feature sequence, so as to obtain an encoded feature sequence for the feature sequence; and determining, in the encoded feature sequence, an encoded feature corresponding to the identification feature as the target feature, wherein the encoding network is an encoding network based on an attention mechanism.

5. The method according to claim 4, wherein the encoding network comprises a Dropout layer, and wherein when training the encoding network, a loss of the encoding network is negatively correlated with a similarity between two encoded feature sequences obtained by encoding an adjusted feature sequence of same sample data twice, and is positively correlated with a similarity between two encoded feature sequences obtained by encoding adjusted feature sequences of two different sample data.

6. An electronic device, comprising:

at least one processor; and a memory communicatively connected to the at least one processor, wherein the memory stores instructions executable by the at least one processor, the instructions, when executed by the at least one processor, configured to cause the at least one processor to at least:

recognize multimedia data, wherein a plurality of alternative multimedia data exist and the multimedia data comprises data of at least one selected from: an image modality, a text modality, or an audio modality, so as to obtain at least one key information of the multimedia data;

query a predetermined knowledge base according to the at least one key information, so as to determine a multimedia name associated with the at least one key information and an association degree between the multimedia name and the at least one key information; and determine, in the multimedia name, a name of the multimedia data based on a similarity between alternative multimedia data for the multimedia name and the multimedia data, in response to the association degree being less than a first threshold value, wherein the instructions are further configured to cause the at least one processor to at least:

encode the multimedia data so as to obtain first feature data of the multimedia data;

determine a similarity between second feature data of each of the plurality of alternative multimedia data and the first feature data; and determine a multimedia name for target data as the name of the multimedia data, in response to the target data existing in the plurality of alternative multimedia data, wherein a similarity between second feature data of the target data and the first feature data is greater than or equal to a second threshold value;

wherein the instructions are further configured to cause the at least one processor to at least:

encode the data of the at least one modality, so as to obtain at least one feature sequence corresponding to the at least one modality respectively;

fuse features contained in each feature sequence of the at least one feature sequence, so as to obtain a target feature for each feature sequence; and determine the first feature data according to the target feature for each feature sequence; and wherein the instructions are further configured to cause the at least one processor to at least:

encode data of each modality of the at least one modality by using an encoder matched with the modality, so as to obtain a first sub feature sequence;

encode the data of each modality by using a position encoder, so as to obtain a second sub feature sequence;

randomly assign a modal feature to the data of each modality, so as to obtain a third sub feature sequence; and concatenate the first sub feature sequence, the second sub feature sequence and the third sub feature sequence, so as to obtain a feature sequence corresponding to each modality, wherein the modal feature is configured to represent each modality.

7. The electronic device according to claim 6, wherein the multimedia data comprises an image and a text for the image, and wherein the instructions are further configured to cause the at least one processor to at least:

recognize a target object in the image so as to obtain an object information of the target object; and recognize the text for the image so as to obtain an entity information in the text, wherein the at least one key information comprises the entity information and the object information.

8. The electronic device according to claim 6, wherein a number of the at least one key information is at least two, and the predetermined knowledge base comprises a knowledge graph, and wherein the instructions are further configured to cause the at least one processor to at least:

determine, from the knowledge graph, a multimedia name connected with each key information of at least two key information;

determine, for each name in the multimedia name, a number of key information connected to each name in the at least two key information; and determine an association degree between each name and the at least two key information according to the number of the key information, wherein the knowledge graph comprises a plurality of points and a plurality of edges connecting the points, and the plurality of points comprise points representing the at least two key information and points representing the multimedia name.

9. The electronic device according to claim 6, wherein the instructions are further configured to cause the at least one processor to at least:

perform a pooling operation on the features contained in each feature sequence, so as to obtain an identification feature for the feature sequence;

add the identification feature to the feature sequence, so as to obtain an adjusted feature sequence;

encode, by using an encoding network, the adjusted feature sequence, so as to obtain an encoded feature sequence for the feature sequence; and determine, in the encoded feature sequence, an encoded feature corresponding to the identification feature as the target feature, wherein the encoding network is an encoding network based on an attention mechanism.

10. The electronic device according to claim 9, wherein the encoding network comprises a Dropout layer, and wherein when training the encoding network, a loss of the encoding network is negatively correlated with a similarity between two encoded feature sequences obtained by encoding an adjusted feature sequence of same sample data twice, and is positively correlated with a similarity between two encoded feature sequences obtained by encoding adjusted feature sequences of two different sample data.

11. A non-transitory computer-readable storage medium having computer instructions therein, wherein the computer instructions are configured to cause a computer system to at least:

recognize multimedia data, wherein a plurality of alternative multimedia data exist and wherein the multimedia data comprises data of at least one selected from: an image modality, a text modality, or an audio modality, so as to obtain at least one key information of the multimedia data;

query a predetermined knowledge base according to the at least one key information, so as to determine a multimedia name associated with the at least one key information and an association degree between the multimedia name and the at least one key information; and determine, in the multimedia name, a name of the multimedia data based on a similarity between alternative multimedia data for the multimedia name and the multimedia data, in response to the association degree being less than a first threshold value, wherein the instructions configured to cause the computer system to determine the name of the multimedia are further configured to cause the at least computer system to at least:

encode the multimedia data so as to obtain first feature data of the multimedia data;

determine a similarity between second feature data of each of the plurality of alternative multimedia data and the first feature data; and determine a multimedia name for target data as the name of the multimedia data, in response to the target data existing in the plurality of alternative multimedia data, wherein a similarity between second feature data of the target data and the first feature data is greater than or equal to a second threshold value;

wherein the instructions configured to cause the computer system to encode the multimedia data so as to obtain first feature data of the multimedia data are further configured to cause the computer system to at least:

encode the data of the at least one modality, so as to obtain at least one feature sequence corresponding to the at least one modality respectively;

fuse features contained in each feature sequence of the at least one feature sequence, so as to obtain a target feature for each feature sequence; and determine the first feature data according to the target feature for each feature sequence; and wherein the instructions configured to cause the computer system to encode the data of the at least one modality are further configured to cause the computer system to at least:

encode data of each modality of the at least one modality by using an encoder matched with the modality, so as to obtain a first sub feature sequence;

encode the data of each modality by using a position encoder, so as to obtain a second sub feature sequence;

randomly assign a modal feature to the data of each modality, so as to obtain a third sub feature sequence; and concatenate the first sub feature sequence, the second sub feature sequence and the third sub feature sequence, so as to obtain a feature sequence corresponding to each modality, wherein the modal feature is configured to represent each modality.

12. The non-transitory computer-readable storage medium according to claim 11, wherein the multimedia data comprises an image and a text for the image, and wherein the instructions are further configured to cause the computer system to at least:

recognize a target object in the image so as to obtain an object information of the target object; and recognize the text for the image so as to obtain an entity information in the text, wherein the at least one key information comprises the entity information and the object information.

13. The non-transitory computer-readable storage medium according to claim 11, wherein a number of the at least one key information is at least two, and the predetermined knowledge base comprises a knowledge graph, and wherein the instructions are further configured to cause the computer system to at least:

determine, from the knowledge graph, a multimedia name connected with each key information of at least two key information;

determine, for each name in the multimedia name, a number of key information connected to each name in the at least two key information; and determine an association degree between each name and the at least two key information according to the number of the key information, wherein the knowledge graph comprises a plurality of points and a plurality of edges connecting the points, and the plurality of points comprise points representing the at least two key information and points representing the multimedia name.

14. The non-transitory computer-readable storage medium according to claim 11, wherein the instructions are further configured to cause the computer system to at least:

perform a pooling operation on the features contained in each feature sequence, so as to obtain an identification feature for the feature sequence;

add the identification feature to the feature sequence, so as to obtain an adjusted feature sequence;

encode, by using an encoding network, the adjusted feature sequence, so as to obtain an encoded feature sequence for the feature sequence; and determine, in the encoded feature sequence, an encoded feature corresponding to the identification feature as the target feature, wherein the encoding network is an encoding network based on an attention mechanism.

15. The non-transitory computer-readable storage medium according to claim 14, wherein the encoding network comprises a Dropout layer, and wherein when training the encoding network, a loss of the encoding network is negatively correlated with a similarity between two encoded feature sequences obtained by encoding an adjusted feature sequence of same sample data twice, and is positively correlated with a similarity between two encoded feature sequences obtained by encoding adjusted feature sequences of two different sample data.

* * * * *